(12) United States Patent
Sokol et al.

(10) Patent No.: US 12,519,921 B2
(45) Date of Patent: Jan. 6, 2026

(54) MISCALIBRATION DETECTION FOR VIRTUAL REALITY AND AUGMENTED REALITY SYSTEMS

(71) Applicant: Magic Leap, Inc., Plantation, FL (US)

(72) Inventors: Gil Sokol, Tel Aviv (IL); Moshe Bouhnik, Holon (IL); Ankur Gupta, Union City, CA (US); David Gadot Kabasu, Herzliya (IL); Konstantinos Zampogiannis, San Jose, CA (US)

(73) Assignee: Magic Leap, Inc., Plantation, FL (US)

( * ) Notice: Subject to any disclaimer, the term of this patent is extended or adjusted under 35 U.S.C. 154(b) by 369 days.

(21) Appl. No.: 18/265,085

(22) PCT Filed: Nov. 29, 2021

(86) PCT No.: PCT/US2021/060942
§ 371 (c)(1),
(2) Date: Jun. 2, 2023

(87) PCT Pub. No.: WO2022/119759
PCT Pub. Date: Jun. 9, 2022

(65) Prior Publication Data
US 2024/0106998 A1      Mar. 28, 2024

(30) Foreign Application Priority Data

Dec. 4, 2020   (GR) .............................. 20200100714

(51) Int. Cl.
| | |
|---|---|
| *H04N 13/327* | (2018.01) |
| *G06N 3/08* | (2023.01) |
| *G06N 3/126* | (2023.01) |
| *G06N 7/01* | (2023.01) |
| *G06T 19/00* | (2011.01) |
| *G06V 10/44* | (2022.01) |
| *G06V 20/70* | (2022.01) |
| *H04N 13/00* | (2018.01) |

(Continued)

(52) U.S. Cl.
CPC ......... *H04N 13/327* (2018.05); *G06T 19/006* (2013.01); *G06V 10/44* (2022.01);
(Continued)

(58) Field of Classification Search
None
See application file for complete search history.

(56) References Cited

U.S. PATENT DOCUMENTS

| 8,736,636 B2 | 5/2014 | Kang |
| 8,793,770 B2 | 7/2014 | Lim |

(Continued)

FOREIGN PATENT DOCUMENTS

CN      110958467 B   * 12/2020   .......... G06F 18/214

OTHER PUBLICATIONS

International Search Report and Written Opinion in International Appln. No. PCT/US2021/060942, mailed Mar. 23, 2022, 28 pages.

*Primary Examiner* — Mohammed Jebari
(74) *Attorney, Agent, or Firm* — Fish & Richardson P.C.

(57) ABSTRACT

Methods, systems, and apparatus, including computer programs encoded on computer storage media, for performing miscalibration detection. One of the methods includes receiving sensor data from each of multiple sensors of a device in a system configured to provide augmented reality or mixed reality output to a user. Feature values are determined based on the sensor data for a predetermined set of features. The determined feature values are processed using a miscalibration detection model that has been trained, based on examples of captured sensor data from one or more devices, to predict whether a miscalibration condition of one or more of the multiple sensors has occurred. Based on the output of the miscalibration detection model, the system determines whether to initiate recalibration of extrinsic parameters for at least one of the multiple sensors or to bypass recalibration.

18 Claims, 5 Drawing Sheets

(51) Int. Cl.
  *H04N 13/239* (2018.01)
  *H04N 13/246* (2018.01)
  *H04N 13/271* (2018.01)
  *H04N 13/344* (2018.01)

(52) U.S. Cl.
  CPC ........... *G06V 20/70* (2022.01); *H04N 13/239* (2018.05); *H04N 13/246* (2018.05); *H04N 13/271* (2018.05); *H04N 13/344* (2018.05); *G06N 3/08* (2013.01); *G06N 3/126* (2013.01); *G06N 7/01* (2023.01); *H04N 2013/0081* (2013.01)

(56) References Cited

U.S. PATENT DOCUMENTS

| | | | |
|---|---|---|---|
| 8,823,855 B2 | 9/2014 | Hwang | |
| 8,874,673 B2 | 10/2014 | Kim | |
| 10,038,966 B1* | 7/2018 | Mehra | G06V 40/168 |
| 10,992,928 B1* | 4/2021 | Rehder | H04N 17/002 |
| 2016/0117864 A1* | 4/2016 | Cajigas | G09G 5/00 |
| | | | 345/633 |
| 2018/0031829 A1* | 2/2018 | Thomas | G02B 27/0093 |
| 2019/0065027 A1 | 2/2019 | Hauenstein et al. | |
| 2019/0158813 A1 | 5/2019 | Rowell et al. | |
| 2019/0172223 A1 | 6/2019 | Vajda et al. | |
| 2019/0197982 A1 | 6/2019 | Chi et al. | |
| 2019/0340435 A1 | 11/2019 | Rabinovich et al. | |
| 2020/0353878 A1 | 11/2020 | Briggs | |
| 2021/0225035 A1* | 7/2021 | Devitt | G06T 7/50 |
| 2021/0295561 A1* | 9/2021 | Abbeloos | G06V 20/56 |
| 2021/0377505 A1* | 12/2021 | Liu | H04N 13/246 |
| 2022/0053039 A1* | 2/2022 | Bhatt | H04L 67/131 |
| 2022/0198710 A1* | 6/2022 | Kuang | G06T 7/80 |
| 2023/0324988 A1* | 10/2023 | Eble | G06T 7/70 |
| | | | 345/156 |
| 2023/0326078 A1* | 10/2023 | Lee | H04N 5/265 |
| | | | 382/114 |

\* cited by examiner

```
                                                    ┌─ 500
                                                    ▼
┌─────────────────────────────────────────────────────────────┐
│ Accessing sets of sensor data from one or more devices that  │
│ each include a first sensor and a second sensor, each set of │
│ sensor data including first sensor data from the first sensor│
│ and second sensor data from the second sensor                │
│                                                      502     │
└─────────────────────────────────────────────────────────────┘
                              │
                              ▼
┌─────────────────────────────────────────────────────────────┐
│ Generating distorted sets of sensor data by introducing      │
│ distortion to the received sets of sensor data               │
│                                                      504     │
└─────────────────────────────────────────────────────────────┘
                              │
                              ▼
┌─────────────────────────────────────────────────────────────┐
│ Generating a feature vector for each of the received sets of │
│ sensor data and for each of the distorted sets of sensor data│
│                                                      506     │
└─────────────────────────────────────────────────────────────┘
                              │
                              ▼
┌─────────────────────────────────────────────────────────────┐
│ Processing each of the generated feature vectors with the    │
│ miscalibration detection model to obtain a corresponding     │
│ output of the miscalibration detection model                 │
│                                                      508     │
└─────────────────────────────────────────────────────────────┘
                              │
                              ▼
┌─────────────────────────────────────────────────────────────┐
│ Adjusting parameters of the miscalibration detection model   │
│ based on the outputs from the miscalibration detection model │
│                                                      510     │
└─────────────────────────────────────────────────────────────┘
```

FIG. 5

MISCALIBRATION DETECTION FOR VIRTUAL REALITY AND AUGMENTED REALITY SYSTEMS

CROSS-REFERENCE TO RELATED APPLICATION

This application is a National Stage Application under 35 U.S.C. § 371 and claims the benefit of International Application No. PCT/US2021/060942, filed Nov. 29, 2021, which claims priority to Greece application No. 20200100714, filed Dec. 4, 2020, entitled MISCALIBRATION DETECTION FOR VIRTUAL REALITY AND AUGMENTED REALITY SYSTEMS, the disclosure of which is incorporated herein by reference.

TECHNICAL FIELD

This specification generally relates to image processing in virtual, mixed, or augmented reality systems.

BACKGROUND

Augmented reality ("AR") devices and mixed reality ("MR") devices can include multiple sensors. Some examples of sensors cameras, accelerometers, gyroscopes, global positioning system receivers, and a magnetometer, e.g., a compass.

An AR device can receive data from multiple sensors and combine the data to determine an output for a user. For instance, an AR device can receive gyroscope and camera data from respective sensors and, using the received data, present content on a display. The AR device can generate an environment map using the sensor data, e.g., camera data, and use the environment map to present the content on the display.

SUMMARY

In some implementations, a computer vision system includes multiple sensors and includes functionality to recalibrate the relationships among the sensors. To determine when recalibration is needed, the system can use a machine learning model, such as a classifier, to evaluate features of sensor data captured by the system. When the machine learning model predicts that a miscalibration has occurred (e.g., a likely change in the physical positioning of one sensor relative to another), the output of the machine learning model can trigger the recalibration functionality of the system. As a result, the machine learning model can initiate recalibration when needed to maintain high-quality output of the system. In addition, the recalibration trigger provided by the machine learning model helps the system to avoid trying to correct for miscalibrations when there are none, which can improve efficiency and reduce processing requirements significantly.

A computer vision system can use sensor data to generate an environment model of an environment in which a device, e.g., the computer vision system, is located, to estimate a position of the device within the environment, or both. For instance, the computer vision system can use data from multiple sensors to generate a three-dimensional digital model for the environment in which the device is located. The sensors can include depth sensors, cameras, inertial measurement units, or a combination of two or more of these.

A computer vision system can be configured to dynamically detect miscalibrations and deformations during use, and to adjust its calibration of the sensors to compensate for the changes. For example, an augmented reality headset can have multiple cameras and functionality to detect and correct for miscalibrations that arise during operation. Lightweight, wearable augmented reality devices, e.g., headsets, can be prone to small and abrupt deformations over time that can cause small transformations or rotations of sensors relative to each other. Even if the deformations are temporary and small in magnitude, the changed positions of the sensors can introduce noticeable inaccuracies in the displayed positions of virtual content with respect to the real-world environment. Dynamic calibration during use can adjust the parameters for relating sensor outputs to each other to account for deformations that may occur while the system is in use.

In many cases, dynamic calibration can be a computationally intensive process, especially if repeated frequently. Calibration may consume significant processing resources of a system and may also introduce latency, while also competing for limited processing resources needed for processing incoming data, updating an environment model, generating output, and other tasks. As a result, it is desirable to avoid or bypass recalibration when not needed to avoid unnecessary processing overhead. To achieve this, the system can use a trained machine learning classifier that can assess incoming sensor data and predict whether a miscalibration condition is present. The model itself can process incoming sensor data (or features derived from sensor data) with much lower computational requirements than the recalibration algorithms, allowing the model to be used in real time or substantially real time to assess incoming sensor data streams. Detection of a miscalibration using the model can then trigger initiation of recalibration processes, causing the recalibration to be performed only when it is most likely to be needed.

Dynamic recalibration during use of the system can improve the accuracy of alignment of multiple sensors included in a single device. The process can be performed automatically, responsive to deformations or other stresses to the device, in a manner that is transparent to or hidden from the user. This can provide a repeated, selective recalibration of extrinsic parameters for the sensors, which define the location and orientation of the sensors with respect to a reference (e.g., to a position on the device, to the world frame, to another sensor, etc.). By detecting miscalibration and conditioning recalibration on the detection, the system can adjust extrinsic parameters for cameras and other sensors when needed, and can skip adjusting the extrinsic parameters when it is unnecessary.

A miscalibration detection process can be used to detect deformations in a device that alter positions of the device's sensors relative to each other. The device can be an augmented reality device such as an augmented reality headset. Optionally, the miscalibration detection process may operate on an individual set of sensor data captures, e.g., a single "frame" including an image from each of the cameras at approximately the same time. In some implementations, the miscalibration detection process can accumulate data from multiple frames of sensor data, such as multiple sets of images captured during a window of time. The miscalibration detection system uses a machine learning model to process the data in order to detect miscalibrations that may arise through physical deformation of a device or other conditions.

Miscalibration can be detected (e.g., predicted to be present by a classifier or other model) based on a single type of sensor data, or based on multiple types of sensor data. In some implementations, miscalibration can be detected based only on image data from cameras. In some implementations, miscalibration can be detected based on image data as well as depth data from one or more depth sensors. In some implementations, data from inertial measurement units (IMUs) or other types of sensors can additionally or alternatively be used to detect miscalibration.

Calibration error can be detected (e.g., predicted using a model) between any two imaging sensors including single-channel visible light cameras, active depth projector/receptor systems, passive depth cameras, infrared cameras, color cameras, and other types of sensors. When calibration error is detected, a miscalibration detection system triggers a recalibration of extrinsic parameters for the sensors. Thus, recalibration of the sensors can be performed when needed, and can be skipped when not needed. In this way, power consumption can be reduced and processing capacity can be allocated for other tasks. The described systems can perform miscalibration detection, and recalibration, while an augmented reality system is in use by a user. For example, the miscalibration detection and recalibration can be done for the system concurrent with the system capturing image data, generating augmented reality output data, and displaying the output data on a headset or other display. Many augmented reality systems include or are provided as wearable devices, such as a headset, that cameras and other sensors are mounted on. As a result, these systems are often moved during use as the user walks, turns his head, or makes other movements. These movements often change the forces and stresses on the device, which can cause temporary and/or permanent deformations to the wearable device. The system can be recalibrated automatically, as the system determines is necessary, while the augmented reality system is worn and in motion. This can result in improved performance for highly deformable systems which may experience a large amount of bending, rotation, and other movements.

A miscalibration detection model can be trained using synthetic data, actual captured data, captured data that has been altered or synthetically distorted, or a combination of them, to detect an occurrence of deformation. Such deformation may occur due to elastic deformation over time and usage, sensitivity of the device to temperature, user movement while wearing the device, and more. Once the miscalibration detection model determines that deformation has occurred, recalibration processes can be initiated.

The subject matter described in this specification can be implemented in various embodiments and may result in one or more of the following advantages. In some implementations, the miscalibration detection process described in this document is faster, uses fewer computer resources, e.g., processor cycles, memory, or both, or a combination of these, compared to other systems. In some implementations, the camera calibration process described in this document can make adjustments to account for deformation of a device that includes the camera.

In some implementations, the miscalibration detection process described can improve a true positive rate by increasing a rate at which a recalibration process accurately activates to correct miscalibrations. In some implementations, the miscalibration detection process described can improve a false positive rate by reducing a rate at which a recalibration is falsely activated, e.g., when no deformations are present.

One innovative aspect of the subject matter described in this specification is embodied in methods that include the actions of receiving sensor data from each of multiple sensors of a device in a system configured to provide augmented reality or mixed reality output to a user; determining feature values based on the sensor data for a predetermined set of features; processing the determined feature values using a miscalibration detection model that has been trained, based on examples of captured sensor data from one or more devices, to predict whether a miscalibration condition of one or more of the multiple sensors has occurred; and determining, based on output of the miscalibration detection model, whether to initiate recalibration of extrinsic parameters for at least one of the multiple sensors or to bypass recalibration of the extrinsic parameters.

Other embodiments of this and other aspects include corresponding systems, apparatus, and computer programs, configured to perform the actions of the methods, encoded on computer storage devices. A system of one or more computers or other processing devices can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

These and other embodiments may each optionally include one or more of the following features. In some implementations, the miscalibration detection model has been trained to predict an occurrence of deformation of the device has occurred to change a position of the multiple sensors relative to each other.

In some implementations, the system is configured to (i) initiate a recalibration of the extrinsic parameters in response to the miscalibration detection model indicating at least a minimum likelihood or magnitude of miscalibration, and (ii) bypass recalibration of the extrinsic parameters in response to the miscalibration detection model indicating less than the minimum likelihood or magnitude of miscalibration.

In some implementations, the method includes receiving multiple sets of sensor data from the multiple sensors over time; and repeatedly performing analysis involving generating feature values based on the sensor data, processing the feature values based on the sensor data, and determining whether to initiate recalibration of the extrinsic parameters. The analysis is performed concurrently with presentation, by the device, of artificial elements aligned with a current view of the user of an environment of the user.

In some implementations, the generating of feature values based on the sensor data, the processing of the feature values based on the sensor data, and the determining whether to initiate recalibration of the extrinsic parameter are performed substantially in real time as the sensor data is acquired.

In some implementations, the extrinsic parameters include at least one of a translation or a rotation of at least one of the multiple sensors with respect to a reference.

In some implementations, the reference is a location on the device or one of the multiple sensors of the device.

In some implementations, the miscalibration detection model is a machine learning model.

In some implementations, the machine learning model is at least one of a neural network, a support vector machine, a classifier, a regression model, a reinforcement learning model, a boosting algorithm, a clustering model, a decision tree, a random forest model, a genetic algorithm, a Bayesian model, or a Gaussian mixture model.

In some implementations, the device is an augmented reality device or a mixed reality device.

In some implementations, the device is a headset.

In some implementations, the multiple sensors include multiple cameras.

In some implementations, the multiple sensors include at least one depth sensor.

In some implementations, the multiple sensors include at least one inertial measurement unit.

In some implementations, receiving the sensor data includes receiving multiple sets of sensor data from the multiple sensors over time. Determining the feature values includes determining a set of feature values for each of multiple sets of sensor data collected during a window of time; and determining the feature values by combining the sets of feature values for the multiple sets of sensor data collected during the window of time.

In some implementations, combining the sets of feature values includes determining, for a particular a feature, a combined feature value that is at least one of a mean, median, minimum, or maximum of the feature values for the particular feature for the multiple sets of sensor data collected during the window of time.

In some implementations, the method includes performing miscalibration analysis for each of multiple windows of time. Each of the multiple windows of time includes multiple frames of data capture using the multiple sensors. The analysis for a window of time involves generating feature values based on the multiple frames of sensor data captured within the window of time, processing the feature values based on the multiple frames of sensor data captured within the window of time, and determining whether to initiate recalibration of the extrinsic parameters.

In some implementations, the multiple windows of time are overlapping windows of time.

In some implementations, the multiple windows of time are non-overlapping windows of time.

In some implementations, the method includes identifying key points in an environment of the device; and determining locations of the key points in images captured using the multiple sensors. The feature values are determined based on the locations of the key points in the images.

In some implementations, the key points include three-dimensional points on edges or corners of objects in the environment.

In some implementations, one or more of the feature values are based on a reprojection error for one or more of the key points.

In some implementations, one or more of the feature values are respectively based on reprojection error values for different spatial dimensions.

In some implementations, at least one of the feature values is determined based on: determining, for a frame of data including data from each of the multiple sensors, a reprojection error value for each of multiple key points; and averaging the reprojection error value for each of the multiple key points to determine an average reprojection error value for the frame of data.

In some implementations, the at least one of the feature values is a median value of the reprojection error values for multiple frames of data captured in a particular window of time.

In some implementations, the feature values include at least one of: a value indicating a reprojection error for a subset of points in images captured using the multiple sensors; a value indicating a reprojection error for a particular spatial dimension; a value indicating a reprojection error for a set of points filtered for a particular region; a value based on a depth measurement from a depth sensor; a value based on a depth measurement based on triangulation using images from multiple cameras; or a value based on a ray to a three-dimensional point vector.

In some implementations, the method is performed locally to the user by one or more processors worn or carried by the user, while the device is in operation to receive sensor data and present real-time augmented reality data to the user based on the received sensor data.

In some implementations, the method is performed remotely by a computer system in communication with the device.

One innovative aspect of the subject matter described in this specification is embodied in methods that include the actions of accessing sets of sensor data from one or more devices that each include a first sensor and a second sensor, each set of sensor data including first sensor data from the first sensor and second sensor data from the second sensor; generating distorted sets of sensor data by introducing distortion to the accessed sets of sensor data; generating a feature vector for each of the accessed sets of sensor data and for each of the distorted sets of sensor data; and training a miscalibration detection model to predict whether a miscalibration of sensors of a device has occurred by: processing each of the generated feature vectors with the miscalibration detection model to obtain a corresponding output of the miscalibration detection model; and adjusting parameters of the miscalibration detection model based on the outputs from the miscalibration detection model.

These and other embodiments may each optionally include one or more of the following features. In some implementations, the one or more devices include a headset.

In some implementations, the miscalibration detection model is trained to indicate whether there is miscalibration between the first sensor and the second sensor.

In some implementations, introducing distortion includes applying an offset or rotation to at least one of the first sensor data or the second sensor data.

In some implementations, the sensor data includes one or more of image data or depth data.

In some implementations, the first sensor and the second sensor each include one of a camera or a depth sensor.

In some implementations, generating each of the feature vectors includes: determining a reprojection error vector based on the first sensor data and the second sensor data; determining one or more feature values based on the reprojection error vector; and generating the feature vector based on the one or more feature values determined based on the reprojection error vector.

In some implementations, each of the feature vectors includes a median value determined for a characteristic, the median value being determined across respective values for different key points in a frame of sensor data.

In some implementations, the characteristics include one or more of visual characteristic or depth characteristic.

In some implementations, the value determined for the characteristic includes one or more of a median value for a set of reprojection error values or depth error values for the respective key points.

In some implementations, the value determined for the characteristic includes a magnitude of a reprojection error vector or one or more components of the reprojection error vector.

In some implementations, the value determined for the characteristic includes a median ratio for a set of ratios for different key points in a frame of sensor data. The ratio is between a depth-sensor depth value for a key point and a triangulation depth value for the key point.

In some implementations, the value determined for the characteristic includes a median of values representing characteristics of a vector for each of multiple key points. The vector for each of the multiple key points is between (i) a position of a 3D point determined for the key point using data from a depth sensor and (ii) a 3D ray determined based on a position of the key point in an image from a camera.

In some implementations, the first sensor data and the second sensor data are captured while the one or more devices capturing the first and second sensor data is at substantially a same pose and physical arrangement.

In some implementations, the method includes: determining a label for each of the feature vectors, the labels indicating whether the feature vector represents an accurate calibration or a miscalibration; comparing the outputs of the miscalibration detection model with the corresponding labels for the feature vectors. Adjusting the parameters of the miscalibration detection model is based on the comparison.

Methods in accordance with the present disclosure may include any combination of the aspects and features described herein. That is, methods in accordance with the present disclosure are not limited to the combinations of aspects and features specifically described herein, but also include any combination of the aspects and features provided.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
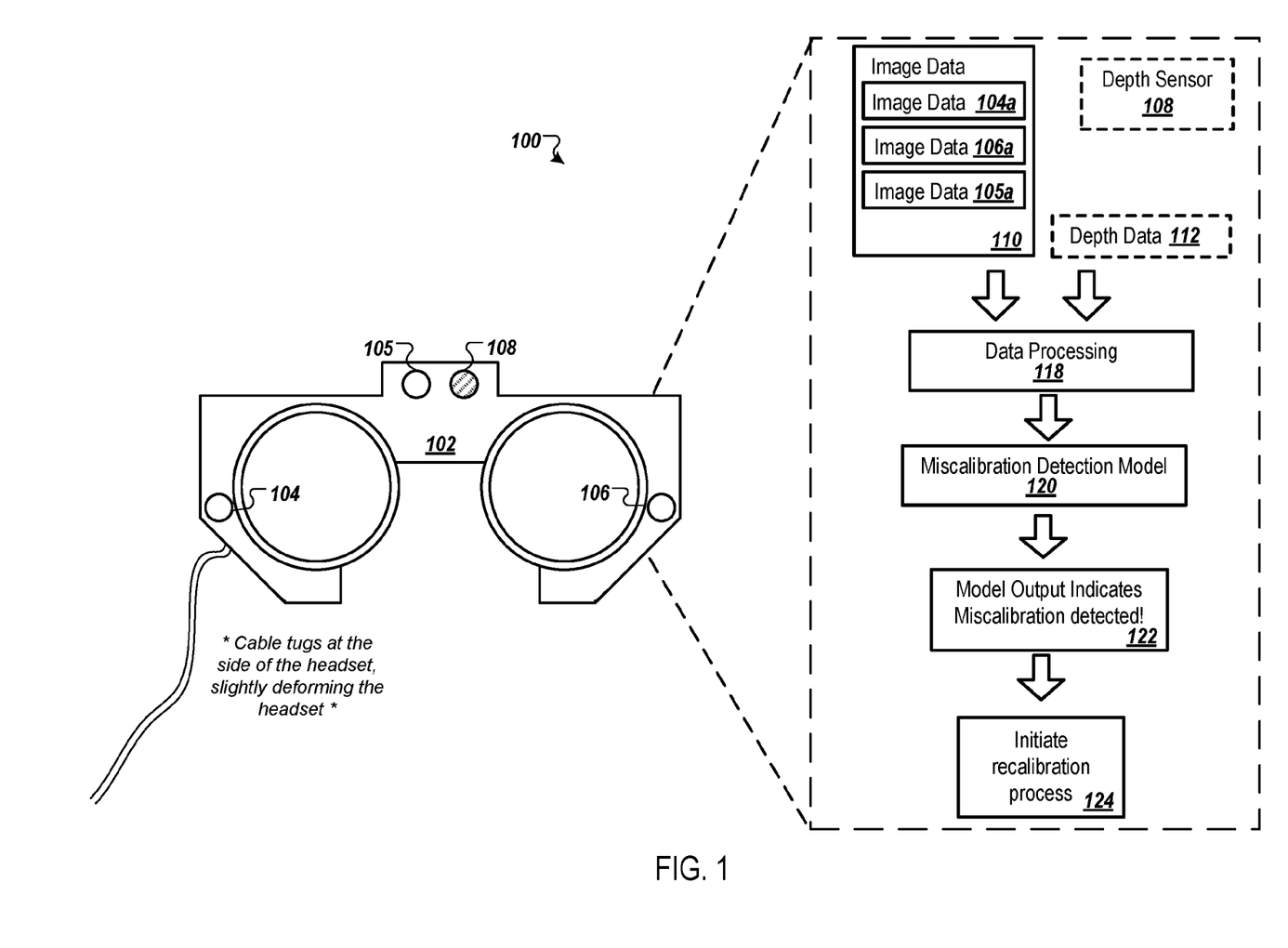
FIG. 1 depicts an example system in which a device detects miscalibration between sensors of a headset.

FIG. 1 depicts an example system 100 in which a device performs miscalibration detection. Although FIG. 1 is described with reference to an augmented reality headset 102 as the device, any other appropriate computer vision system can be used instead of, or in addition to, an augmented reality headset 102.

The augmented reality headset 102 is a device that uses cameras or other sensors to acquire information about the three-dimensional environment around it and to add digital elements on a screen, a virtual retinal display, or other display technology. For example, the headset 102 or associated electronics can use information from multiple cameras to determine the positions of real-world objects, map the sizes and positions in three-dimensional space, and generate and present three-dimensional computer-generated imagery integrated into a view of the environment. This process is performed in a real-time manner, so that the computer-generated imagery integrates with or is shown in alignment with the user's current view. For example, as the wearer of the headset 102 moves his or her head to view a different portion of a room, the display of digitally-generated elements is adjusted to maintain their appropriate apparent position within the room. The process of generating and displaying imagery to appear to be at the correct spatial position is highly dependent on the calibration of the cameras or other sensors that provide data to generate the map of the environment and determine the current position of the headset 102 within the environment. As a result, miscalibration of the sensors, whether due to deformation of the headset 102 or another cause, can significantly degrade the quality of a user's experience with the headset 102. For example, miscalibration can result in digitally-added imagery being displayed at incorrect or inconsistent positions with respect to the real-world environment.

The augmented reality headset 102 includes a right camera 104 and a left camera 106. The augmented reality headset 102 also optionally includes a center camera 105 and a depth sensor 108. Other sensors such as inertial measurement units (IMUs) can also be included. As the augmented reality headset 102 moves through the physical environment, the augmented reality headset 102 receives image data 110 captured by the cameras 104, 105, and 106. The augmented reality headset 102 can also optionally receive depth data 112 captured by the depth sensor 108. For example, when the augmented reality headset 102 is at a particular physical location, or pose, in the physical environment, the cameras 104, 105, 106 can capture particular image data 110 for the particular physical location.

The sensors of the headset 102 are typically mounted at fixed positions (e.g., fixed location and orientation) on the headset 102, but the structure of the headset itself (e.g., a frame, chassis, housing, or other elements) may be subject to deformations due to various forces, such as a cord pulling on the headset 102, an impact such as dropping the headset 102, positioning of the headset 102 by the wearer, thermal expansion, and other forces. Even very small changes to the relative positions of the sensors, such as changes on the orders of millimeters of translation or fractions of a degree of rotation, can result in noticeable changes in the quality of augmented reality imagery provided by the headset 102.

In the example of FIG. 1, the headset 102 receives data from the various sensors in an ongoing manner, such as video feeds or data streams. The headset 102 can receive and process incoming sets of data from the sensors as a sequence of "frames" of sensor data. Each frame represents a capture from each of the sensors, approximately at the same time (e.g., the data captures nearest in time to each other). For example, if sensor data is capture at 60 Hz, one frame of sensor data is captured roughly every 0.016 seconds, and each frame includes (1) an image 104a captured by the camera 104, (2) an image 105a captured by the camera 105, (3) an image 106a captured by the camera 106, and captures for any other sensors used (e.g., depth measurement, IMU measurement, etc.).

In some implementations, the image data 110 is obtained as a video feed, such as a sequence of images. For instance, the image data 110 can be an image frame in a video sequence. The image data from the cameras can be represented as values for pixels. In the frame of reference of the headset 102, the cameras show images with pixel values for horizontal and vertical axes (e.g., x dimension and y dimension). The depth sensor 108 can obtain a corresponding depth measurement 112 captured at substantially the same time, or within a threshold period of time, as the images from the cameras. A single depth measurement can include different depth values for different spatial positions, such as an array of depth values representing a two-dimensional grid. In essence, the depth data 112 can be a pixel grid in which the pixel data is depth from the headset 102 (e.g., distance in a z dimension outward from the headset 102) rather than light intensity. In some implementations, a depth sensor can capture data for a larger field of view of the physical environment than individual cameras 104, 105, 106.

The headset 102 or associated electronics can relate the images from the cameras, the depth data from the depth sensor, and other sensor data to a three-dimensional model of the environment. This can include processes such as simultaneous localization and mapping (SLAM) to construct or update a map of the environment while simultaneously keeping track of a location of the headset 102 in the environment. In essence, the data from the sensors can be mapped to the model of the real-world environment, so that portions of the The headset 102 or associated circuitry (e.g., a component attached with cable) can include one or more data processing devices. For instance, the headset 102 can include one or more processors and memory that includes software to cause the processors to perform the functions discussed herein.

The example of FIG. 1 shows how the headset 102 can detect and respond to a miscalibration using a miscalibration detection model 120. In the example, a miscalibration occurs in the headset 102. The miscalibration can be, for example, a difference in sensor parameters from a calibration of the headset 102. In some cases, miscalibration may occur due to factors such as age, heat, or agitation of the headset, or of the sensors of the headset. The miscalibration may be caused by a deformation to the headset 102. The miscalibration may occur, for example, when the pose of the headset 102 moves from a first pose to a second pose, when the headset 102 is agitated, or when the headset 102 is exposed to conditions such as heat or moisture. In the example, a small deformation to the headset 102 occurs when a cable tugs at one side of the headset 102.

Deformation may include a rotation and/or translation of one sensor in relation to another. This can be caused by bending of the headset or another perturbation of the headset. The deformation can cause a change in relative position between a sensor and a reference position on the headset 102. The reference position may be, for example, the camera 105, the depth sensor 108, or another reference position.

The small deformation to the headset 102 causes a change in the relative positions of the cameras 104, 105, 106, which is reflected in the image data 110 received from these cameras. The headset 102 uses the change in properties of the images from the cameras to detect the deformation. The headset 102 first performs processing 118 on the sensor data (e.g., image data 110, depth data 112, and/or other sensor data) to determine feature values for key features of interest that are indicative of miscalibration. For example, these features can be based on reprojection error, e.g., a geometric error corresponding to the image distance between a projected point and a measured one. Similarly, the features can be based on differences between depth values determined using a depth sensor and depth values determined using triangulation from image data. Additional examples of features and techniques for deriving them are discussed below.

The headset 102 provides the generated feature values as input to a miscalibration detection model 120. The miscalibration detection model 120 has previously been trained to detect miscalibration of the headset 102. The miscalibration detection model 120 may detect miscalibration between a sensor of the headset and a reference position. The reference position can be any appropriate reference position within the device that includes the depth sensor and the cameras. For instance, the reference position can be another camera, the depth sensor, an inertial measurement unit, or another appropriate position on the device.

In some examples, the miscalibration detection model 120 can detect miscalibration between multiple sensors. For example, the miscalibration detection model 120 can detect miscalibration between the camera 104 and the camera 106, between the camera 104 and 105, or between the camera 105 and 106. In another example, the miscalibration detection model 120 can detect miscalibration between the camera 104 and the depth sensor 108, the camera 105 and the depth sensor, or the cameras 104, 105, 106, and the depth sensor.

The miscalibration detection model 120 can be, for example, a machine learning model, such as a neural network, a decision tree, a classifier, etc. For example, the miscalibration detection model 120 can include single level decision trees trained using a boosting algorithm. Gradient boosting can be used to create an ensemble of regression trees. In many cases, this type of model can use a series of decision trees, where the output of each tree in the series depends on the prior trees in the series. The miscalibration detection model 120 is trained using a data set that includes the same types of sensor data the model 120 will be used with when deployed, e.g., image data and depth data. A training process for training the miscalibration detection model 120 is described in greater detail in reference to FIG. 2.

The system can perform miscalibration detection while the headset 102 is in use, e.g., while the headset operating to capture data about the environment and provide additional imagery to integrate with the user's view of the environment. For example, the headset may be in use by a user who is wearing the headset.

The miscalibration detection model 120 quickly determines whether or not the sensors of the headset are miscalibrated. If miscalibration is detected, the system initiates a recalibration process 124. If miscalibration is not detected, the system may skip performing the recalibration process 124. In this way, the system can avoid attempting to correct deformations when no deformations are present, thereby increasing efficiency and keeping processing resources available for other tasks.

In some implementations, the devices and software for detecting miscalibration and performing recalibration resides on the headset 102 or associated hardware worn or carried by the wearer. In some implementations, devices and software used to detect miscalibration and perform recalibration of the headset 102 can be included in a separate system, such as a server that communicates with the augmented reality headset 102 using a network. The network (not shown), can be a local area network (LAN), wide area network (WAN), the Internet, or a combination thereof. The separate system may use a single server computer or multiple server computers operating in conjunction with one another, including, for example, a set of remote computers deployed as a cloud computing service.

The system 100 can perform miscalibration detection at designated intervals. For example, the system may perform miscalibration detection analysis for every image frame of a video, every other image frame, every third image frame, every tenth frame, etc. In some examples, the system can perform miscalibration detection based on receiving image data 110 for multiple poses, e.g., multiple positions of the headset 102 with respect to the environment. In some examples, the system can perform miscalibration detection based on movement of the headset 102 over a threshold distance. In some examples, the system can perform miscalibration detection based on a change of position of the headset from one area of the environment to another area of the environment. For example, the system may perform miscalibration detection when the headset 102 moves from one room of a property to another room of the property. The headset 102 can determine an amount of movement based on, e.g., applying SLAM techniques to determine positions of the headset 102 within the environment.

Upon recalibrating the headset, the device can provide the updated sensor calibration data for use as input to a simultaneous localization and mapping (SLAM) process that determines an update to an environment model and an estimated position of the device within the environment. For example, the device provides the updated sensor calibration data to a SLAM engine included in the headset 102 or associated electronics.

Figure 2:
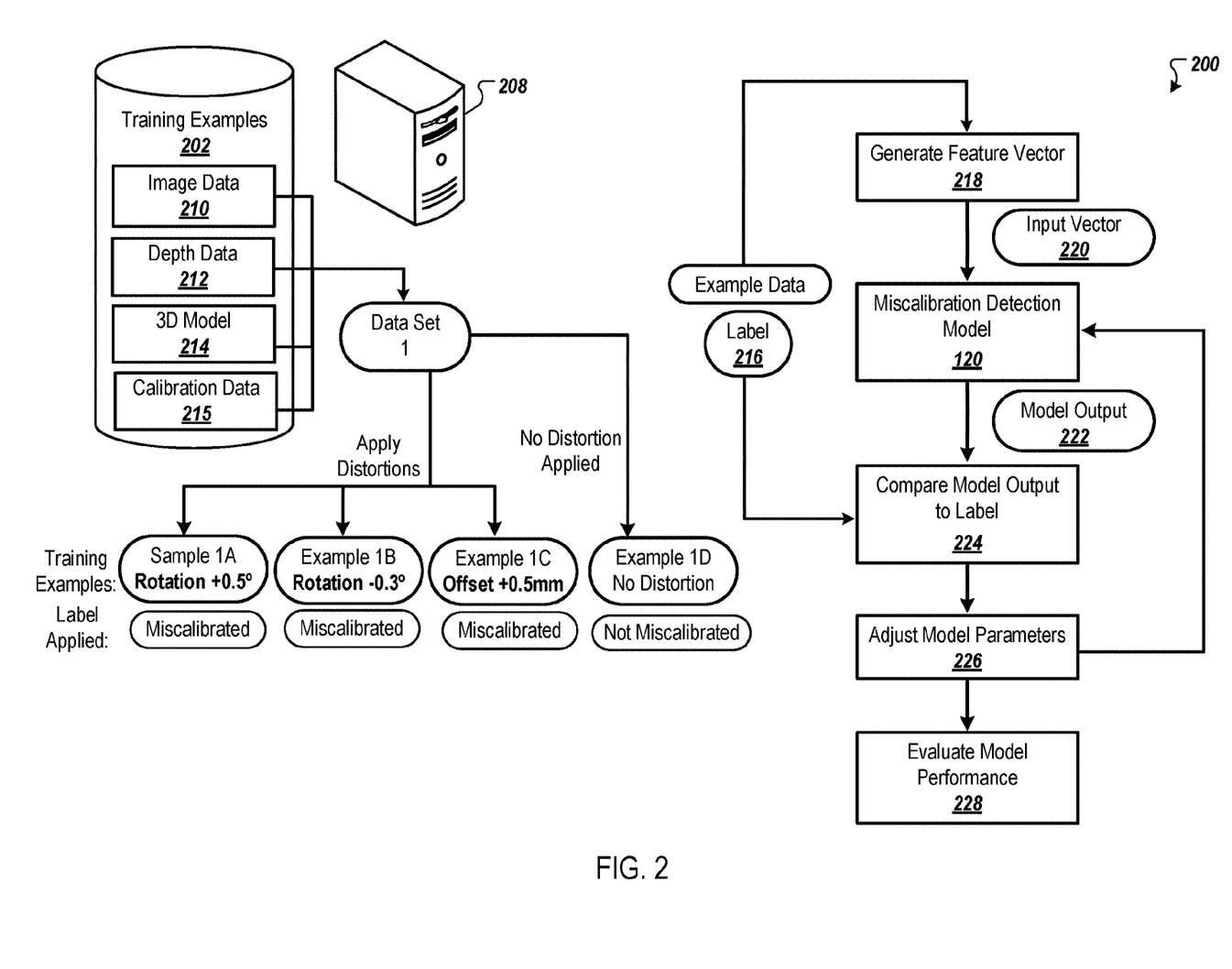
FIG. 2 depicts an example system for training a miscalibration detection model 120 for an augmented reality device.

FIG. 2 depicts an example system 200 for training a miscalibration detection model 120 for an augmented reality device. The system trains the miscalibration detection model 120 using a set of training data. The training process has several major components. One is collection of examples of sensor data from headsets, so the sensor data can be used as training data for the model 120. From the collected sets of sensor data, the system applies different types of distortions to generate different training examples that represent different types of miscalibrations. These synthetically distorted data sets give examples of a broad range of miscalibrations that the model might encounter in actual use. The training examples are each assigned a label, e.g., a training target or ground truth label, with examples that have been distorted being labelled as miscalibrated, and those that have not being labeled as not miscalibrated. The system 200 then iteratively trains the model 120 by providing feature vectors determined from the training examples, comparing the output of the model 120 for an example with the label for the example, and then adjusting model parameters to improve the accuracy of the model 120.

Training data can include training examples 202 stored in a database 204 hosted by a server 208. Each training example 202 can include a data set of at least one of training image data 210, training depth data 212, and a three-dimensional (3D) model 214 of an environment. Each training example 202 can also include calibration data 215. For example, Data Set 1 includes training image data 210, corresponding depth data 212, and a corresponding portion of a 3D model. The image data 210 and depth data 212 of Data Set 1 is captured at substantially the same time, and includes calibration data 215 that is accurately calibrated.

In some implementations, the sensor data may be a single frame of data. For example, the sensor data can include an image data frame and a corresponding depth data frame. In some examples, the sensor data can include a certain number of frames of data, e.g., three frames, five frames, or ten frames. In some implementations, the sensor data may be data that was captured over a time period, e.g., of one second. The frame rate of the image data and depth data may be, for example, thirty frames per second. Thus, each training example may include, e.g., thirty frames of sensor data.

The training examples stored in the database are calibrated and do not have deformations. In some implementations, the training image data 210 is for an image in a sequence of video images. For instance, the training image data 210 can be for a frame in a video sequence. The training image data 210 can include pixel data for pixels of an image captured by cameras of the headset, e.g., the cameras 104, 105, and 106. The training image data can include image data captured by multiple cameras at substantially the same time, or within a threshold period of time.

The training depth data 212 can be for a corresponding frame of depth data captured at substantially the same time, or within a threshold period of time, as the training image data 210. The training depth data 112 includes data for at least some of the same points in the physical environment as the points represented by the image data 110. The depth data can include data that indicates, for each of multiple points in a physical environment, an estimated distance from the depth sensor 108 to the point in the physical environment. For instance, the training depth data 212 can include multiple pixels and, for each of the pixels, an estimated distance from the depth sensor 108 to a corresponding point in the physical environment that is represented by the pixel. In some examples, the estimated distance can be from the device, e.g., the augmented reality device, to the point in the physical environment.

The depth data 212 can be a coordinate in a 3D model, e.g., the 3D model 214. The 3D model of the environment can be a 3D model of the environment where the headset 102 is used, or has been previously used. For example, the 3D model of the environment can be a 3D model of a room or space where the headset 102 is worn by a user.

For instance, each point of the 3D model can have x-y coordinates that correspond to a location of the point in the depth data 212 captured by a corresponding depth sensor, or multiple depth sensors. The estimated distance can be a third coordinate, e.g., a z coordinate.

The depth data and the image data can represent multiple points. In some implementations, the device can transform two or more of the multiple points from the depth sensor space to the camera space. This can include generating, for each of the two or more points, an estimated image point using a transformation.

Data Set 1 may include image data 210, depth data 212, 3D model data 214, and calibration data 215. The system deforms at least one of the image data 210, the depth data 212, the 3D model data 214, or the calibration data 215 to generate distorted sets of sensor data.

As an example, the system 200 may produce training example 1A by applying a rotation of +0.5° between two sensors, e.g., the image data from camera 104 and the image data from camera 105. The system may generate training example 1B by applying a rotation of −0.3° between two sensors, e.g., the image data from camera 106 and the depth data from the depth sensor 108. The system may generate training example 1C by applying an offset of +0.4 mm between two sensors, e.g., the image data from camera 104 and image data from camera 106.

The synthetic training examples can include some training examples that do not include miscalibration. For example, the system can leave certain training examples undistorted, and include the undistorted training examples in the set of synthetic training examples. As an example, training example 1D is undistorted.

The system 200 applies a label 216 to each synthetic training example. For example, each training example 1A to 1D may be labeled either "miscalibrated" or "not miscalibrated." For example, the training examples 1A to 1C can be labeled "miscalibrated" while the training example 1D can be labeled "not miscalibrated."

In some examples, a training example may be labeled with a specific amount and/or type of miscalibration. For example, the training examples 1A and 1B may be labeled "miscalibrated, rotation." In another example, the training example 1A may be labeled "miscalibrated, rotation, +0.5°" while the training example 1B is labeled "miscalibrated, rotation, −0.3°."

The training examples are used to train the miscalibration detection model 120. For example, the training examples 1A to 1D, including respective labels 216, can each be provided as example data for a model training process.

For each training example, the system 200 generates feature vectors (218). For example, the system 200 generates feature vectors for the distorted training examples 1A-1C and for the undistorted training example 1D. A feature vector is an n-dimensional vector of numerical values that represent features of the training examples that include the samples of sensor data. The numeric values are compose the feature vector.

To generate feature vectors for a particular training example, the system 200 first identifies key points for the training example. For example, the system 200 can select a subset of points in the sensor data to be key points. In some examples, key points may correspond to edges, corners, or other landmarks of objects represented in the sensor data.

Once key points are identified for a training example, the system 200 determines feature values for each key point. Feature values can include visual feature values, depth feature values, or a combination of both visual feature values and depth feature values.

An example visual feature value is reprojection error. The system 200 can determine reprojection error for each key point. Reprojection error can provide a measure of accuracy by quantifying how closely a position of a key point as detected by one sensor aligns with the position of the point as detected by another sensor. The reprojection error can be represented, e.g., by a magnitude of an error vector in a two-dimensional image plane. In some examples, the reprojection error can be represented by an x-coordinate magnitude of error, by a y-coordinate magnitude of error, or both. In some examples, reprojection error can be represented by a magnitude in one dimension, filtered by key point location. Reprojection error is described in greater detail with reference to FIGS. 3A and 3B.

Depth features can include, for example, a depth measure based on two different sources of depth information. For example, the depth measure can be a depth ratio, such as a ratio of a calculated depth based on depth data from a depth sensor, and calculated depth based on image data (e.g., by triangulating using multiple images). For example, the system can determine the depth, or z-coordinate, of a key point based on depth data from a depth sensor, e.g., the depth sensor 108. The depth sensor may be aligned to the center camera 105, such that the system 200 assumes constant transformation between the depth sensor 108 and the center camera 105. The system can also determine a depth of the key point based on image data. For example, the system can determine the depth of the key point based on triangulating image data from the left camera 105 with image data from the right camera 104. The system can determine a ratio between the calculated depth based on the depth data and the calculated depth based on the image data.

Depth features can also include median values of a vector connecting (i) the key point location determined based on depth data from the depth sensor and (ii) a key point ray determined based on image data. For example, the system 200 can determine a 3D coordinate location of a key point based on depth data from the depth sensor, aligned with the center camera 105. The 3D coordinate location based on the depth data can include an x-coordinate, y-coordinate, and z-coordinate. The system 200 can transform the 3D coordinate point to free camera coordinates.

The system 200 can also determine a ray from camera, e.g., the left camera 104, that passes through the corresponding key point, based on calibration data. The system can then determine an offset from the ray of the key point based on depth data. The depth offset can be represented by an offset vector. The system 200 can determine features of the offset vector. Features of the offset vector can include a magnitude in the x direction, a magnitude in the y direction, and a magnitude in the z direction. Features of the offset vector can also include a norm, or magnitude that describes the extent of the vector in space.

The system 200 determines median values of feature values across the set of key points. For example, the system 200 can determine a median of the reprojection error or depth ratio for multiple key points in a single frame of the training example. The system 200 can also determine a median of one or more of the depth offset values, e.g., x, y, z, and norm, for multiple key points in the single frame.

Once the median feature value is determined for individual frames, the system 200 aggregates median values for multiple different frames of data. For example, for multiple frames of data, the system can determine the average of the median values of reprojection error which were determined across the set of key points. The values can be aggregated over multiple frames captured during a time period. For example, the system can aggregate median feature values for the frames captured during a time period of one second, 0.2 seconds, or 200 milliseconds. As an example, for a frame rate of thirty frames per second, the feature values can be aggregated for the thirty frames captured during one second.

The system 200 provides the feature vector, including the aggregated feature values, as an input vector 220 to the miscalibration detection model 120. The system 200 uses the feature vectors for the training examples to train the miscalibration detection model 120. For example, the system provides the feature vectors for training examples 1A-1D to the miscalibration detection model 120.

The miscalibration detection model 120 receives the input vector 220. In some examples, the miscalibration detection model 120 calculates a scalar product between the input vector 220 and a vector of weights. The miscalibration detection model 120 then compares the resulting scalar product with a threshold. Based on comparing the resulting scalar product with the threshold, the miscalibration detection model 120 provides a model output 222. The model output 222 can include a determination that the training example is miscalibrated or is not miscalibrated.

The miscalibration detection model 120 produces a model output 222. The model output 222 includes a determination of "miscalibrated" or "not miscalibrated" for each training example. In some examples, the output can include a confidence level of the determination. For example, the output may include a determination of "miscalibrated" for Data Set 1A, with a confidence level of 0.7.

The system compares 224 the output of the miscalibration detection model 120 to target output. The target output is determined by the labels 216 of the training examples. For example, the label 216 of Data Set 1B is "miscalibrated." The model output 222 for the Data Set 1B may be "not miscalibrated." Thus, the system determines that the model output 222 does not match the label 216 for Data Set 1B.

In another example, the label 216 of Data Set 1D is "not miscalibrated." The model output 222 for the Data Set 1D may be "miscalibrated." Thus, the system determines that the model output 222 does not match the label 216 for the Data Set 1D.

Based on determining that the model output 222 does not match the label 216 for Data Set 1B, the system can adjust model parameters 226. For example, the system can adjust or update weights or parameters of the miscalibration detection machine learning model.

The system 200 can repeat the process of training the miscalibration detection model 120 using multiple sets of training examples. The system can continue to update weights of the miscalibration detection model based on model outputs 222 that do not match the label 216 for the corresponding training example.

Upon adjusting weights of the miscalibration detection model 120, the system 200 can evaluate model performance 228. For example, the system 200 can continually or periodically evaluate a percentage of the training examples that are accurately classified by the miscalibration detection model 120. The system 200 can continue to provide training examples to the miscalibration detection model 120 in order to achieve a desired accuracy.

Figure 3A:
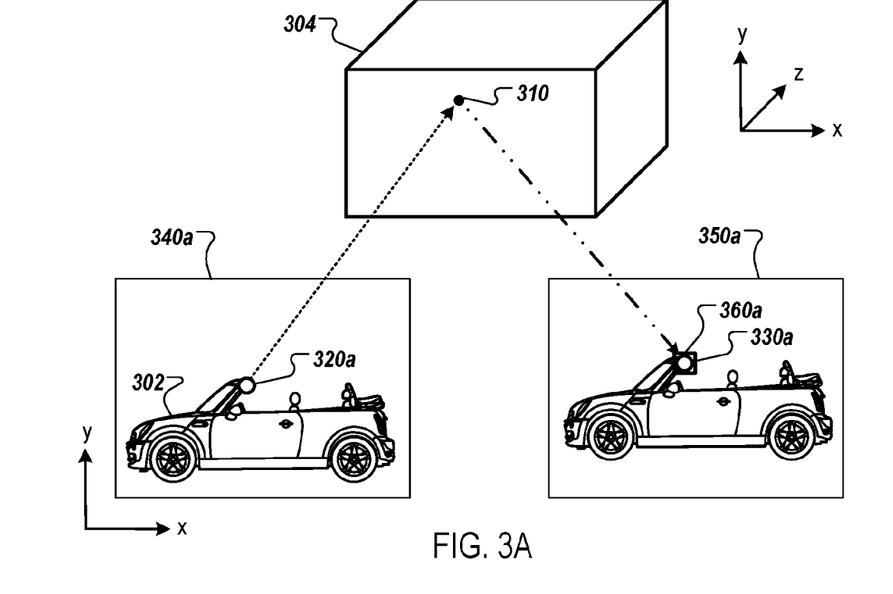
FIGS. 3A and 3B depict an example of reprojection error in an augmented reality device.
Figure 3B:
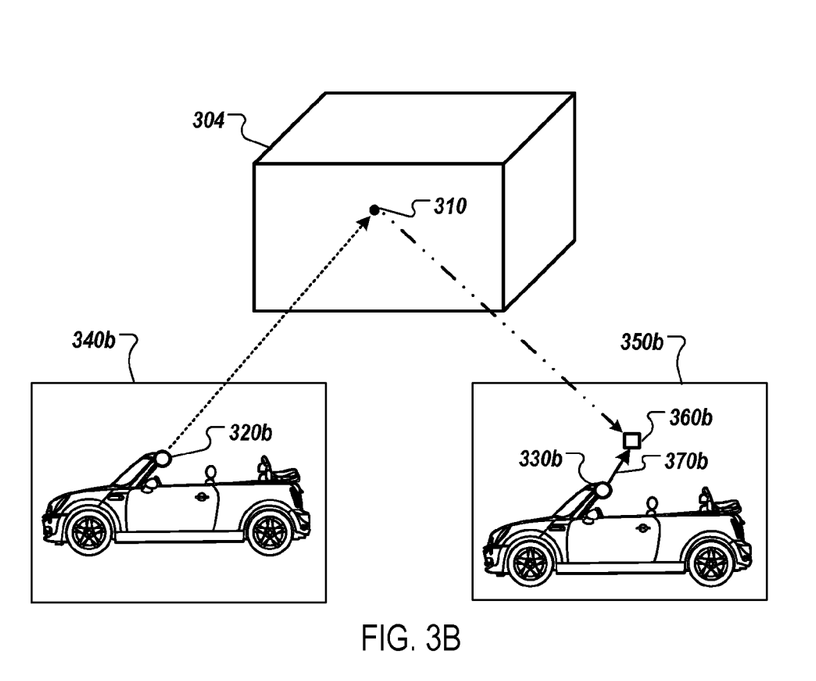

FIGS. 3A and 3B depict a visual representation of reprojection processing. The images shown are not necessarily displayed to a user, but are shown to illustrate the concept of reprojection and reprojection error. The example headset includes a left camera that captures an image 340a/340b, and a right camera that captures another image 350a/350b. The left camera and the right camera each capture a two-dimensional image that provides a view of a three-dimensional space 304.

Rather than processing every pixel of captured image data and every point in the model of the space 304, the system selects a small subset of points in the space 304 to be key points. The system tracks the locations of these key points and determines the portions of captured images that show these key points. In many cases, the system selects key points to be on edges, corners, or other landmarks of objects in the space 304. In the example, the system selects a key point 310 as a three-dimensional point in the space 304 to use for tracking and calibration.

When the cameras each capture a two-dimensional image of the space 304, they capture what is essentially a projection from the three-dimensional space 304 onto a two-dimensional image sensor plane of the camera. The system determines which pixels or portions of the two-dimensional images 340a/340b, 350a/350b correspond to (e.g., show or represent) the key points. For example, the system can determine x and y coordinates for each image that would show the key point 310. In the example of FIGS. 3A and 3B, the key point 310 corresponds with a corner of a windshield of vehicle 302. The examples of FIGS. 3A and 3B only show one key point 310, but typically many different key points are determined and tracked, so that each image often shows multiple (e.g., dozens or hundreds) of points selected as key points.

The system can create a digital model of the 3D space 304, e.g., the 3D model 214. Point locations in the 3D space 304 can be defined using three coordinates in the x, y, and z dimensions. The left camera and the right camera may capture images of the 3D space 304 at the same time or at approximately the same time. More importantly, the images from the cameras can be captured with the headset having a consistent pose (e.g., position, including location and orientation) and physical state (e.g., arrangement or deformation status) are the same. In other words, the image captures are made close enough in time so that the headset has not substantially moved or changed in shape between the capture of the image from one camera and the related capture of an image from the other camera. Although illustrated in FIGS. 3A and 3B as having only two cameras, in some implementations the headset can include additional cameras, and can optionally include a depth sensor and other types of sensors.

Reprojection error can provide a measure of accuracy by quantifying how closely a position of a key point as detected by one sensor aligns with the position of the point as detected by another sensor. Reprojection is a process that takes the information about a key point as projected in one reference frame, and projects it back into another reference frame. For example, the image 340a/350a represents a projection of the 3D key point 310 into the 2D image sensor plane of the left camera. Reprojection can involve taking the identified data for the key point that occurs in the image 340a/350a and projecting it back into the model for the 3D space 304, and potentially from the model into the 2D image space of the right camera (e.g., onto the image 340b/350b). Doing this reprojection from one camera space onto another camera space (or from either or both camera spaces into the 3D model space) makes use of the calibration data for the headset. For example, to know how the perspective of the left camera relates to the real world and to the perspective of the right camera, camera extrinsic parameters for the cameras are used. The extrinsic parameters can define the position of the camera center and the camera's heading with respect to a reference. If the camera extrinsic parameters for one or more cameras are incorrect, the result will be a difference between (i) the position that a key point actually appears in an image and (ii) the position in which the reprojected key point occurred in the image. This difference between actual and reprojected points is an example of reprojection error, and the magnitude of reprojection error is indicative of the level of miscalibration that is present. Stated another way, when reprojection error increases, the system can infer that a deformation or other event has changed the position of one or more cameras and that adjustment to the calibration data (e.g., camera extrinsic parameters) needs to be performed.

FIG. 3A illustrates an example of reprojection of the key point 310 with no reprojection error. The actual key point 310 in the environment is captured as a point 320a in the image 340a from one camera and is shown as a point 330a in the image 350a from the other camera. The two points 320a, 330a are shown by a circle in the respective images. The two cameras are physically offset from each other and have perspectives on the space 304, so the points 320a, 330a appropriately are not at the same pixel coordinates in the two images 340a, 350a.

The system reprojects the key point from one camera space to another to assess the calibration of the device. For example, the system projects the point 320a from the image 340a into the model for the 3D space 304, and from the model into the image 350a of the other camera. This results in a reprojected point 360a, shown by a square. The reprojection makes use of calibration data for the cameras, in order to relate the positions of the cameras to each other and to the world. As illustrated, the reprojected point 360a for key point 310 coincides with the originally projected point 330a for key point 310 that was obtained by the camera. This provides an example where the calibration of the cameras is correct, and so there is no reprojection error.

FIG. 3B illustrates an example of reprojection of the key point 310 that shows reprojection error. Similar to FIG. 3A, the two cameras each capture an image 350a, 350b that includes a view of the key point 310 in the space 304. The key point 310 in the environment is captured as a point 320b in the image 340b from one camera and is shown as a point 330b in the image 350b from the other camera. The two points 320b, 330b are shown by a circle in the respective images.

The system reprojects the key point 310 from one camera space to another to assess the calibration of the device. For example, the system projects the point 320b from the image 340b into the model for the 3D space 304, and from the model into the image 350b of the other camera. This results in a reprojected point 360b, shown by a square. The reprojection makes use of calibration data for the cameras, in order to relate the positions of the cameras to each other and to the world. In this case, unlike in FIG. 3A, the reprojected point 360b for key point 310 does not coincide with the originally projected point 330b for key point 310 that was obtained by the camera. This shows a reprojection error, indicating that the calibration of the cameras is not correct.

The reprojected point 360b is offset from point 330b by vector 370b. In this example, vector 370b represents the reprojection error of key point 310 from one camera to another. The vector 370b has x and y (e.g., horizontal and vertical) components, and both can be used to assess the calibration of the cameras. The reprojection error can be caused, for example, by miscalibration of camera parameters for the left camera, the right camera, or both. The reprojection error demonstrates that there is a miscalibration among the images 340b and 350b therefore illustrate image data that is being used with an incorrect calibration.

In general, data sets that result in a reprojection error greater than a threshold error can be classified as "miscalibrated," while image data including reprojection error less than a threshold can be classified as "not miscalibrated." In many cases there are many different factors to consider in determining whether a miscalibration is present, and so the reprojection error can be one of several different factors or features considered by a miscalibration detection model 120. Other factors include depth measurements and triangulated depth values, information about filtered sets of key points, characteristics of rays to key points, and so on.

Figure 4:
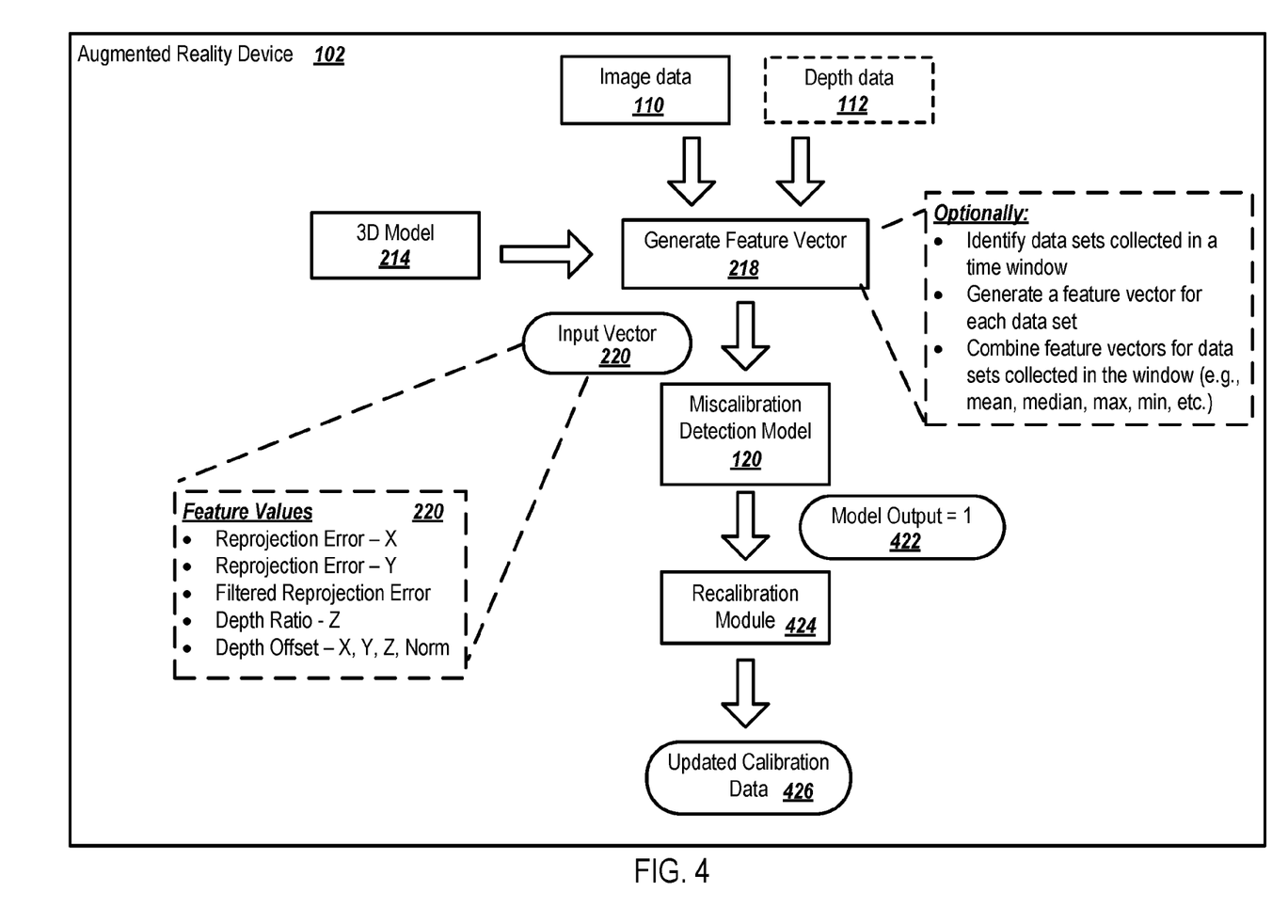
FIG. 4 depicts an example system for identifying miscalibration between sensors of a headset using a trained miscalibration detection model.

FIG. 4 depicts an example system 400 for performing miscalibration detection. In the system 400, the headset 102 performs miscalibration detection using the miscalibration detection model 120. The miscalibration detection model 120 has been trained using the process described in reference to FIG. 2.

In the system 400, the right camera 104, the center camera 105, and the left camera 106 capture images of the environment. The cameras 104, 105, and 106 output image data 110 to the miscalibration detection model 120. The miscalibration detection model 120 receives the image data 110 as input. The miscalibration detection module can also receive, as input, the 3D model of the environment.

The various functional components of the augmented reality headset 102 may be installed on one or more computers as separate functional components or as different modules of a same functional component. For example, the miscalibration detection model 120 and the recalibration module 424 can be implemented as computer programs installed on one or more computers in one or more locations that are coupled to each through a network. In cloud-based systems for example, these components can be implemented by individual computing nodes of a distributed computing system.

The miscalibration detection model 120 can be stored on the headset 102, on a cloud-based server, or both. The miscalibration detection model can detect miscalibrations in sensor data received from sensors of the headset.

Miscalibration detection, as shown in FIG. 4, can be performed while the headset 102 is in operation, e.g., while the user is wearing the headset 102. While the user wears the headset 102, the sensors of the headset, e.g., cameras, depth sensors, etc., capture sensor data. The sensor data can include image data and depth data.

The system 400 can generate feature vectors for sets of data. For example, the system 400 can generate feature vectors 218 for sets of image data and corresponding depth data. The feature vectors are provided as input vectors 220 to the miscalibration detection model 120.

As described with reference to FIG. 2, the input vectors 220 can include various feature values based on the image data 110, the depth data 112, and the 3D Model 214. For example, the feature values 420 can include visual features such as reprojection error in the x and y dimensions, and filtered reprojection error. The feature values 420 can also include depth features such as a depth ratio of calculated depth values in the z-dimension, and values of a depth offset vector between calculated 3D key point locations.

The miscalibration detection model 120 receives the feature vectors as input vectors 220 and provides a model output 422. The model output 422 can be, for example, a binary determination of one or zero. A model output 422 of one may indicate that the sensor data is miscalibrated, while a model output 422 of zero may indicate that the sensor data is not miscalibrated. In some cases, the miscalibration detection model can output a determination along with a confidence level of the determination. In some examples, the miscalibration detection model can output a type or magnitude of miscalibration. For example, the miscalibration detection model 120 may identify and output a type of miscalibration of "rotation." The miscalibration detection model 120 may identify and output a magnitude of miscalibration of "+0.5°."

In the example of FIG. 4, the miscalibration detection model 120 outputs a model output 422 of one. The model output 422 of one indicates that miscalibration has been detected. Based on detecting miscalibration, a recalibration module 424 initiates a recalibration process. The recalibration process can adjust parameters of sensors of the headset. For example, the recalibration process can adjust extrinsic parameters of the cameras, the depth sensors, etc. The recalibration module 424 corrects the deformation and realigns the sensors to reduce or eliminate the miscalibration.

In some examples, the recalibration module may receive additional data output from the miscalibration detection model 120. For example, the recalibration module may receive a confidence value output by the miscalibration detection model 120. The recalibration module may also receive a type or magnitude of miscalibration output by the miscalibration model. Based on receiving the confidence value, type, and/or magnitude of the miscalibration, the recalibration module can realign parameters of sensors in order to correct the identified miscalibration.

In some examples, the miscalibration detection model 120 may output a model output of zero. The model output of zero indicates that miscalibration has not been detected. Based on detecting no miscalibration, the system can bypass or turn off the recalibration module.

The system 400 may perform miscalibration detection at any appropriate interval or frequency. In some examples, the system 400 may perform miscalibration detection continuously, or near continuously. In some examples, the system 400 may perform miscalibration detection using a sequence of frames. For example, the sequence of frames may be a sequence of frames captured over a time period, e.g., of one second. As an example, the system 400 may perform the miscalibration detection each second, using sensor data captured during the previous second. In another example, the system 400 may perform the miscalibration detection every five seconds, using sensor data captured during the previous second.

In some implementations, the sensor data may be captured over a time period, e.g., of one second. The frame rate of the image data and depth data may be, for example, thirty frames per second. The system can determine aggregated features for the frames captured during the time period. For example, the system can determine a feature vector including aggregated feature values for the thirty frames captured during the one second. Thus, the miscalibration detection model can identify miscalibration based on aggregated data from multiple frames captured during the time period.

Upon recalibrating the headset, the device can provide the updated sensor calibration data 426 for use as input to a simultaneous localization and mapping process that determines an update to an environment model for the environment and an estimated position of the device within the environment. For example, the device provides the updated sensor calibration data 426 to a SLAM engine included in the device.

With updated extrinsic parameters, accuracy can be improved for the 3D model and the headset poses. Due to the miscalibration detection, updated extrinsic parameters are implemented during operation of the headset 102. Thus, performing miscalibration detection can result in a high accuracy calibration of the headset.

Figure 5:
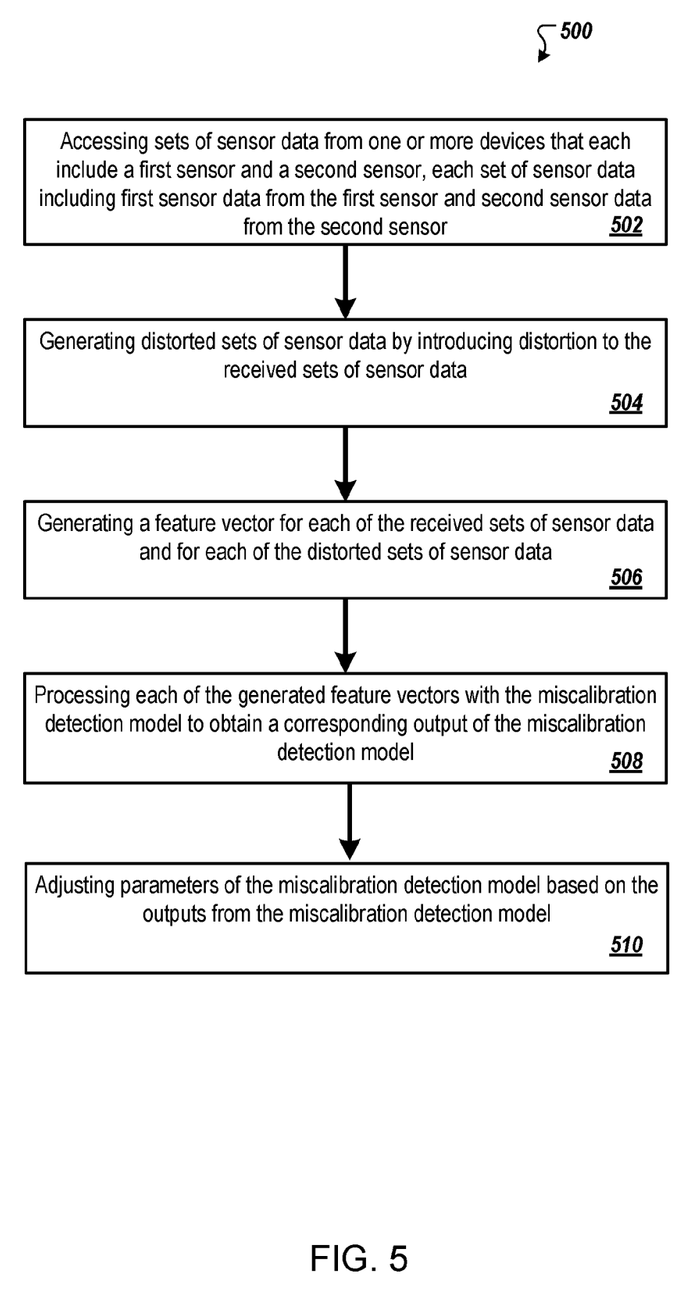
FIG. 5 is a flow diagram of a process for detecting miscalibration between sensors of a headset of an augmented reality device.

Referring to FIG. 5, a process 500 can be used to train the miscalibration detection model 120 of the system 200. For example, the process 500 can be performed by a computing system such as a computer vision device.

The process 500 includes accessing sets of sensor data from one or more devices that each include a first sensor and a second sensor, each set of sensor data including first sensor data from the first sensor and second sensor data from the second sensor (502). The first sensor and the second sensor can each be one of a camera or a depth sensor, e.g., the camera 104 and the depth sensor 108. The sensor data can include image data and depth data, e.g., the image data 110 and the depth data 112. In some examples, the first sensor data and the second sensor data were captured while the device capturing the first and second sensor data is at substantially a same pose and physical arrangement.

The process 500 includes generating distorted sets of sensor data by introducing distortion to the received sets of sensor data (504). Introducing distortion can include applying an offset or rotation to at least one of the first sensor data or the second sensor data. For example, the system 200 may apply deformations to the training examples 202 in order to generate distorted sets of sensor data that can be used as training examples for the miscalibration detection model 120. The miscalibration model 120 may be a machine learning model.

The process 500 includes generating a feature vector for each of the received sets of sensor data and for each of the distorted sets of sensor data (506). Generating each of the feature vectors can include determining a reprojection error vector based on the first sensor data and the second sensor data. The system can determine one or more feature values based on the reprojection error vector. The system can then generate the feature vector based on the one or more feature values determined based on the reprojection error vector.

Each of the feature vectors can include a median value determined for a characteristic. The median value can be determined across respective values for different key points in a frame of sensor data. The features can include one or more of visual features or depth features. In some examples, the features can include one or more of a median value for a set of reprojection error values or depth error values for the respective key points.

In some examples, the values of features can include a magnitude of a reprojection error vector or one or more components of the reprojection error vector. In some examples, the values of features can include a median ratio for a set of ratios for different key points in a frame of sensor data. The ratio may between a depth-sensor depth value for a key point and a triangulation depth value for the key point.

In some examples, the values of features can include a median of values representing characteristics of a vector for each of multiple key points. The vector for each of the multiple key points may be between (i) a position of a 3D point determined for the key point using data from a depth sensor and (ii) a 3D ray determined based on a position of the key point in an image from a camera.

In some examples, the process 500 includes determining a label, e.g., labels 216, for each of the feature vectors. The labels may indicate whether the feature vector represents an accurate calibration or a miscalibration The process 500 includes processing each of the generated feature vectors with the miscalibration detection model to obtain a corresponding output of the miscalibration detection model (508). For example, the system can provide the generated feature vectors as input vectors 220 to the miscalibration detection model 120.

The process 500 includes adjusting parameters of the miscalibration detection model based on the outputs from the miscalibration detection model (510). In some examples, the system can compare the outputs of the miscalibration detection model with the corresponding labels for the feature vectors. For example, the system can compare the model output 222 to the label 216 for a particular training example. Adjusting the parameters of the miscalibration detection model may be based on the comparison of the outputs of the miscalibration detection model with the corresponding labels for the feature vectors.

By processing each of the generated feature vectors with the miscalibration detection model, and adjusting parameters of the miscalibration detection model based on the outputs from the miscalibration detection model, the system can train the miscalibration detection model to predict whether a miscalibration of sensors of a device has occurred. For example, the process 500 can be used to train the miscalibration detection model to indicate whether there is miscalibration between the first sensor and the second sensor.

The order of steps in the process 500 described above is illustrative only, and miscalibration detection can be performed in different orders. In some implementations, the process 500 can include additional steps, fewer steps, or some of the steps can be divided into multiple steps.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a smart phone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., LCD (liquid crystal display), OLED (organic light emitting diode) or other monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an Hypertext Markup Language (HTML) page, to a user device, e.g., for purposes of displaying data to and receiving user input from a user interacting with the user device, which acts as a client. Data generated at the user device, e.g., a result of the user interaction, can be received from the user device at the server.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular embodiments of the invention have been described. Other embodiments are within the scope of the following claims. For example, the steps recited in the claims, described in the specification, or depicted in the figures can be performed in a different order and still achieve desirable results. In some cases, multitasking and parallel processing may be advantageous.

What is claimed is:

1. A computer-implemented method comprising:
   accessing, as accessed sets of sensor data, sets of sensor data from one or more devices that each include a first sensor and a second sensor, each set of sensor data comprising first sensor data from the first sensor and second sensor data from the second sensor;
   generating distorted sets of sensor data by introducing distortion to the accessed sets of sensor data;
   generating, as a generated feature vector, a feature vector for each accessed set of sensor data and for each distorted set of sensor data; and
   training a miscalibration detection model to predict whether a miscalibration of sensors of a device has occurred by:
   processing each generated feature vector with the miscalibration detection model to obtain a corresponding output of the miscalibration detection model;
   determining a label for each generated feature vector, the label indicating whether the generated feature vector represents an accurate calibration or a miscalibration;
   comparing outputs of the miscalibration detection model with corresponding labels for the generated feature vectors; and
   adjusting parameters of the miscalibration detection model based on the comparing outputs of the miscalibration detection model with corresponding labels for the generated feature vectors.

2. The computer-implemented method of claim 1, wherein the one or more devices comprise a headset.

3. The computer-implemented method of claim 1, wherein the miscalibration detection model is trained to indicate whether there is miscalibration between the first sensor and the second sensor.

4. The computer-implemented method of claim 1, wherein introducing distortion comprises applying an offset or rotation to at least one of the first sensor data or the second sensor data.

5. The computer-implemented method of claim 1, wherein the sets of sensor data comprises one or more of image data or depth data.

6. The computer-implemented method of claim 1, wherein the first sensor and the second sensor each comprise one of a camera or a depth sensor.

7. The computer-implemented method of claim 1, wherein generating, as a generated feature vector, a feature vector for each accessed set of sensor data and for each distorted set of sensor data, comprises:
   determining a reprojection error vector based on the first sensor data and the second sensor data.

8. The computer-implemented method of claim 7, comprising:
   determining one or more feature values based on the reprojection error vector.

9. The computer-implemented method of claim 8, comprising:
   generating the feature vector based on the one or more feature values determined based on the reprojection error vector.

10. The computer-implemented method of claim 1, wherein each generated feature vector comprises a median value determined for a characteristic, wherein the median value is determined across respective values for different key points in a frame of sensor data.

11. The computer-implemented method of claim 10, wherein the characteristic comprises a visual characteristic or a depth characteristic.

12. The computer-implemented method of claim 10, wherein the median value determined for a characteristic, comprises one or more of a median value for a set of reprojection error values or depth error values for the respective key points.

13. The computer-implemented method of claim 10, wherein the median value determined for a characteristic, comprises a magnitude of a reprojection error vector or one or more components of the reprojection error vector.

14. The computer-implemented method of claim 10, wherein the median value determined for a characteristic, comprises a median ratio for a set of ratios for different key points in a frame of sensor data, wherein the median ratio is between a depth-sensor depth value for a key point and a triangulation depth value for the key point.

15. The computer-implemented method of claim 10, wherein the median value determined for a characteristic, comprises a median of values representing characteristics of a vector for each of multiple key points, wherein the vector for each multiple key point is between (i) a position of a 3D point determined for the key point using data from a depth sensor and (ii) a 3D ray determined based on a position of the key point in an image from a camera.

16. The computer-implemented method of claim 1, wherein the first sensor data and the second sensor data are captured while the one or more devices capturing the first and second sensor data is at substantially a same pose and physical arrangement.

17. A non-transitory, computer-readable storage medium encoded with instructions that, when executed by one or more computers, cause the one or more computers to perform operations including:
   accessing, as accessed sets of sensor data, sets of sensor data from one or more devices that each include a first sensor and a second sensor, each set of sensor data comprising first sensor data from the first sensor and second sensor data from the second sensor;
   generating distorted sets of sensor data by introducing distortion to the accessed sets of sensor data;
   generating, as a generated feature vector, a feature vector for each accessed set of sensor data and for each distorted set of sensor data; and
   training a miscalibration detection model to predict whether a miscalibration of sensors of a device has occurred by:
      processing each generated feature vector with the miscalibration detection model to obtain a corresponding output of the miscalibration detection model;
      determining a label for each generated feature vector, the label indicating whether the generated feature vector represents an accurate calibration or a miscalibration;
      comparing outputs of the miscalibration detection model with corresponding labels for the generated feature vectors; and
      adjusting parameters of the miscalibration detection model based on the comparing outputs of the miscalibration detection model with corresponding labels for the generated feature vectors.

18. A computer-implemented system comprising one or more computers and one or more non-transitory, computer-readable storage devices on which are stored instructions that are operable, when executed by the one or more computers, to cause the one or more computers to perform operations including:
   accessing, as accessed sets of sensor data, sets of sensor data from one or more devices that each include a first sensor and a second sensor, each set of sensor data comprising first sensor data from the first sensor and second sensor data from the second sensor;
   generating distorted sets of sensor data by introducing distortion to the accessed sets of sensor data;
   generating, as a generated feature vector, a feature vector for each accessed set of sensor data and for each distorted set of sensor data; and
   training a miscalibration detection model to predict whether a miscalibration of sensors of a device has occurred by:
      processing each generated feature vector with the miscalibration detection model to obtain a corresponding output of the miscalibration detection model;
      determining a label for each generated feature vector, the label indicating whether the generated feature vector represents an accurate calibration or a miscalibration;
      comparing outputs of the miscalibration detection model with corresponding labels for the generated feature vectors; and
      adjusting parameters of the miscalibration detection model based on the comparing outputs of the miscalibration detection model with corresponding labels for the generated feature vectors.

* * * * *